United States Patent
Pahl et al.

(10) Patent No.: US 8,814,420 B2
(45) Date of Patent: Aug. 26, 2014

(54) SYSTEM FOR GRAVIMETRICALLY DOSING BULK GOODS COMPONENTS HAVING A TRANSPORT CONTAINER WHICH CAN BE COUPLED TO AND DECOUPLED FROM A DRIVE CARRIAGE

(75) Inventors: Frank Pahl, Höpfingen (DE); Helmut Bauer, Buchen (DE); Christian Leist, Osterberken (DE)

(73) Assignee: AZO Holding GmbH, Osterburken (DE)

( * ) Notice: Subject to any disclaimer, the term of this patent is extended or adjusted under 35 U.S.C. 154(b) by 593 days.

(21) Appl. No.: 12/737,997

(22) PCT Filed: Aug. 25, 2009

(86) PCT No.: PCT/EP2009/006134
§ 371 (c)(1),
(2), (4) Date: May 18, 2011

(87) PCT Pub. No.: WO2010/028744
PCT Pub. Date: Mar. 18, 2010

(65) Prior Publication Data
US 2011/0214780 A1    Sep. 8, 2011

(30) Foreign Application Priority Data
Sep. 12, 2008    (DE) .......................... 10 2008 046 960

(51) Int. Cl.
*G01G 19/22*    (2006.01)
*G01G 19/32*    (2006.01)

(52) U.S. Cl.
USPC ............. 366/141; 177/52; 177/145; 177/163; 141/83; 141/103

(58) Field of Classification Search
USPC ........ 177/52, 145, 163; 141/83, 103; 366/141
See application file for complete search history.

(56) References Cited

U.S. PATENT DOCUMENTS

| | | | | | |
|---|---|---|---|---|---|
| 2,771,288 A | * | 11/1956 | Staples, Jr. et al. | ............ | 177/146 |
| 2,793,024 A | * | 5/1957 | Rose et al. | .................... | 177/136 |
| 3,136,434 A | * | 6/1964 | Mauderer | ..................... | 414/595 |
| 3,842,923 A | * | 10/1974 | Moore | .......................... | 177/163 |

(Continued)

FOREIGN PATENT DOCUMENTS

| | | |
|---|---|---|
| DE | 43 36 233 | 4/1995 |
| EP | 0 794 476 | 9/1997 |

(Continued)

*Primary Examiner* — Randy W Gibson
(74) *Attorney, Agent, or Firm* — Paul Vincent

(57) ABSTRACT

The invention proposes a system for gravimetrically combining individual bulk material components in one or a plurality of transport container(s). The system comprises a plurality of storage containers for storing the bulk material components equipped with one dosing unit each in order to transfer a respective bulk material component into the transport container. Each of the storage containers is associated with a weighing means disposed below each storage container. The transport containers can be moved between the dosing units of the supply containers along a guidance and cooperate with the weighing means. In accordance with the invention, the guidance has several guiding segments that are disposed behind one another in the guiding direction and on which the transport container is guided, and at least the guiding segments disposed below the dosing units of the supply containers are formed by weighing/guiding segments which are mechanically decoupled from the other guiding segments or weighing/guiding segments such that the transport container is in its respective dosing position on the weighing/guiding segments for detecting its weight.

18 Claims, 7 Drawing Sheets

(56) References Cited

U.S. PATENT DOCUMENTS

| | | | |
|---|---|---|---|
| 4,363,369 A * | 12/1982 | Susor | 177/163 |
| 4,550,793 A * | 11/1985 | Giles | 177/145 |
| 4,754,822 A * | 7/1988 | Altenpohl et al. | 177/145 |
| 4,770,260 A * | 9/1988 | Brook | 177/145 |
| 5,381,837 A * | 1/1995 | Kurosu et al. | 141/103 |
| 5,835,982 A * | 11/1998 | Lanaro et al. | 177/145 |
| 5,856,637 A * | 1/1999 | Vande Berg | 177/145 |
| 7,543,979 B2 * | 6/2009 | Yeh | 366/141 |
| 2007/0217284 A1 | 9/2007 | Yeh | |

FOREIGN PATENT DOCUMENTS

| | | |
|---|---|---|
| EP | 1 550 833 | 7/2005 |
| EP | 1 707 926 | 10/2006 |
| WO | WO 95/22042 | 8/1995 |

* cited by examiner

SYSTEM FOR GRAVIMETRICALLY DOSING BULK GOODS COMPONENTS HAVING A TRANSPORT CONTAINER WHICH CAN BE COUPLED TO AND DECOUPLED FROM A DRIVE CARRIAGE

This application is the national stage of PCT/EP2009/006134 filed on Aug. 25, 2009 and also claims Paris Convention priority of DE 10 2008 046 960.2 filed Sep. 12, 2008.

BACKGROUND OF THE INVENTION

The invention concerns a system for gravimetrically combining individual bulk material components in at least one transport container, comprising a plurality of storage containers for storing the bulk material components, each being equipped with one dosing unit in order to transfer the respective bulk material component into the transport container, wherein each of the storage containers is associated with one weighing device disposed below each storage container, and at least one transport container which can be moved between the dosing units of the supply containers along a guidance and cooperates with the weighing means.

There are conventional systems of this type for dosing and, if necessary, for mixing individual bulk material components in accordance with a predetermined composition, wherein the bulk material components may e.g. be components of colors, such as colorants, pigments etc., food, pharmaceutical agents and the like.

EP 1 707 926 A2 describes a system of this type for gravimetrically combining several bulk material components, which are stored in separate storage containers, in one or several transport containers, which can be displaced on a guidance disposed below the supply containers and into which the bulk material components can be transferred from the supply containers using dosing units associated with the supply containers. The guidance is thereby formed by rails along which one or more shuttles roll, which receive the transport containers. In order to ensure gravimetrical dosing, a stationary weighing means is positioned below each dosing unit, which is provided with a lifting means for moving a respective transport container from the shuttle to the weighing means for dosing a bulk material component from a respective supply container, and moving it back to the shuttle after the dosing process for supplying it to the next supply container or a discharge station.

It is the underlying purpose of the invention to further develop a system of the above-mentioned type in a simple and inexpensive fashion in order to improve its throughput and, in particular, be able to easily extend the system, if required, by adding further supply containers and/or transport containers without impairing the throughput thereof.

SUMMARY OF THE INVENTION

In accordance with the invention, this object is achieved in a system the above-mentioned type in that the guidance has several guiding segments which are disposed behind one another in the guiding direction and on which the transport container is guided, and the guiding segments disposed below the dosing units of the supply containers are formed by weighing/guiding segments which are mechanically decoupled from the other guiding segments and/or weighing/guiding segments; such that the transport container is in its respective dosing position on the weighing/guiding segments for detecting its weight.

In contrast to the system in accordance with the above-cited document EP 1 707 926 A2, the inventive design obviates the need for relocating the transport containers between the guidance thereof and the weighing means because the weighing means and the weighing/guiding segments thereof are integrated in the other guiding segments of the guidance. It is thereby naturally possible for all guiding segments to be formed by such weighing/guiding segments in dependence on the length of the guiding segments or in dependence on the separation between the supply containers, or to interpose "normal" guiding segments, i.e. segments which are only used for guidance and have no weighing function, between the weighing/guiding segments disposed below the dosing units of the supply containers. It is, of course, equally also possible, if desired, to provide weighing/guiding segments that extend below the dosing units of several supply containers. The transport container can thereby be moved, either standing on the guiding segments or, in particular, also being suspended therein, along the guidance at least between the closing units of the individual supply containers and generally also a discharge station. When the transport container has reached its dosing position below the dosing unit of the respective supply container, in which it is supported on the weighing/guiding segments, the dosing unit of this supply container starts and dispenses the amount of bulk material controlled by the weighing machine electronics into the transport container. When the desired amount of bulk material components contained in this supply container is then received by the transport container, the dosing unit is switched off by the weighing machine electronics, if necessary, with a slight advance; and the transport container can be moved further along the guidance to the next supply container. This cycle is repeated, if necessary, on further supply containers with other bulk material components until the desired mixture composition or even just a partial charge thereof has formed in the transport container. If the discharge station is not arranged at a position along the guidance, the transport container is subsequently supplied to the discharge station e.g. by removing it from the system, and its content is emptied e.g. into a mixer at the discharge station.

The weighing/guiding segments and, in particular, also the guiding segments may suitably be disposed in pairs and parallel with respect to each other, wherein the weighing/guiding segments and/or, if provided, the "normal" guiding segments without weighing function may be separately designed or be connected to each other such that in any case two parallel, e.g. rail-like, individual guidances for the transport containers are formed on which the latter are guided.

In accordance with a preferred embodiment, the guiding segments and the weighing/guiding segments may be formed by track sections, which form at their upper side a guiding track for guiding means of the transport container. The guiding track of the track sections or the guiding means of the transport container may thereby have roiling or sliding means for ensuring low-friction displacement of the transport container. The guiding track of the track sections may e.g. have a plurality of rollers, arranged behind one another, on which the guiding means of the transport container, which are designed e.g. as runners, carriages or the like, roll along.

While it is, of course, basically possible for the transport containers to have their own drive, in which case the rollers of the guiding track of the guidance or of the guiding means of the transport container may e.g. be driven in a controlled fashion, in accordance with an advantageous embodiment, at least one shuttle may be provided, which is guided parallel to the guidance, in particular, on a rail and is driven in a controlled fashion for displacing the transport container(s) along the guidance, such that the transport containers themselves are consequently passively guided along the guidance, i.e. without being driven. The shuttle may thereby be coupled to and be decoupled from the transport container(s), in particular, using carriers, e.g. in the form of pivotable or extendable grippers, wherein the shuttle preferably has at least two carriers arranged at a separation from each other in the guiding direction, which can be coupled to the transport container(s) and be decoupled therefrom for accepting torques that act on the transport container while it is being carried along, thereby ensuring safe and reliable displacement of the transport container along the guidance. This detachable connection of the shuttle used for driving the transport container enables, in particular, to dispose a respective transport container in its dosing position onto a respective weighing/guiding segment for charging it with the respective bulk material component, wherein the shuttle can move further transport containers during the dosing time. When the dosing process is terminated, the transport container can be moved to its subsequent dosing position by means of the shuttle, such that only a few or even only one shuttle is sufficient for the entire system with respect to the transport containers, which reduces cost. At the same time, it is possible to fill a relatively large amount of transport containers that are positioned in their dosing positions at the same time with the respective bulk material components, thereby guaranteeing a very high throughput or high batch number of the system.

Blocking means for the transport container(s) may moreover be provided in addition to the shuttle(s) for fixing the transport container(s) in its/their respective dosing position. The blocking means, which may suitably be associated with each supply container or each dosing unit of a supply container, may e.g. be designed in the form of pneumatic cylinders, lifting magnets or the like, which hold the transport container in the respective dosing position. It is equally also feasible e.g. to design the blocking means in the form of blocking devices for the rollers of the weighing/guiding segments or the transport containers such that the transport container is held by friction in its respective dosing position.

The inventive system may consequently preferably comprise a plurality of transport containers, wherein it may, of course, also have a plurality of shuttles in dependence on the size or, in particular, in dependence on the number of supply containers, wherein, however, the number of shuttles must be selected to be considerably smaller than the number of transport containers, as mentioned above.

In order to ensure simple and rapid dosing of the respective bulk material component in each dosing position of the transport container, the transport container may suitably comprise a receiving opening that can be closed and faces the dosing units of the supply containers, and the dosing units may comprise a dosing opening that can be closed and faces the transport container, wherein the receiving opening can be moved to coincide with the respective dosing opening when the respective bulk material component has been transferred from the respective supply container into the transport container.

While this coincidence during dosing of the respective bulk material component disclosed in EP 1 707 926 A2 may be realized in that the receiving opening and the dosing opening form a gap between them, which can preferably be vacuumed during dosing in order to prevent contamination, it may be provided that the dosing opening of the dosing unit can be detachably connected to the receiving opening of the transport container substantially in a dust-free fashion through mechanically decoupling the dosing unit from the transport container, in particular, in case of sensitive harmful or environmentally dangerous bulk material components in order to ensure handling thereof, in particular, without causing contamination. "Mechanical decoupling" in this connection means a connection which at least largely prevents transfer of forces between the dosing unit and the transport container docked thereto, to equally ensure highly precise gravimetric detection of the amount of bulk material components transferred to the transport container using the weighing/guiding segments on which the transport container is carried in each dosing position without influencing the weighing unit through coupling forces between the dosing unit and the transport container or secondary force connections transferred to the weighing/guiding segments.

In accordance with one embodiment, the dosing opening of the dosing unit and/or the receiving opening of the transport container may in this connection be arranged on the dosing unit or on the transport container using a resilient connecting element for preventing transfer of forces between the dosing unit and the transport container, wherein the interconnected dosing/receiving openings can be arranged in a relative position with respect to the dosing unit or the transport container such that the resilient connecting element prevents transfer of forces between the dosing unit and the transport container. The dosing opening and/or the receiving opening may thereby e.g. be arranged on a support that can be displaced substantially perpendicularly with respect to the dosing opening or substantially perpendicularly with respect to the receiving opening, and the support may be connected to the dosing unit and/or the transport container via the resilient connecting element, wherein the support can be moved into a relative position with respect to the dosing unit or the transport container, in which the support is in contact with the dosing unit or the transport container exclusively via the resilient connecting element in order to ensure mechanical decoupling of the transport container from the dosing unit of the respective supply container.

With respect to preferentially contamination-free handling of the bulk material components it may moreover be suitable that a closure element of the dosing opening of the respective dosing unit can be coupled to a closure element of the receiving opening of the respective transport container and the closure elements can be displaced together between an open position and a closed position.

Depending on the desired size of the inventive system or depending on the number of supply and transport containers, the supply containers may be arranged in at least one row along the guidance or also in at least two or more rows along at least two or more guidances, wherein in the latter case, the at least two guidances preferably have at least one associated relocating means which is designed for relocating the transport container(s) between the guidances. In this fashion, the throughput can be even further increased, in particular, for relatively large systems in that individual transport containers do not block one another but can deviate to parallel guidances. In both cases it may, however, be suitable to move the transport containers in only one direction along the guidance(s) which can be reversed in exceptional cases.

The relocating means itself may be guided on rails or tracks extending substantially transversely with respect to the guidances, and have at least one guiding segment which can be aligned with the guiding segments and/or the weighing/guiding segments of the at least two guidances such that the transport container can be displaced between the guiding segments and/or the weighing/guiding segments of the at least two guidances and the guiding segment of the relocating means. The relocating means, which has been moved into alignment with one of the parallel guidances, consequently continues the guiding segments or weighing/guiding segments of this guidance with its own guiding segments.

The guidance for the transport containers may otherwise preferably, but of course not necessarily, be suspended, wherein "suspended" defines an arrangement of the guidance substantially off the ground, which facilitates cleaning of the system. The guidance may thereby e.g. be arranged on a supporting frame which is mounted to the floor or is also suspended, e.g. fixed to a ceiling of a building.

Further features and advantages of the invention can be extracted from the following description of embodiments with reference to the drawing.

In the drawing:

DESCRIPTION OF THE PREFERRED EMBODIMENT

Figure 1:
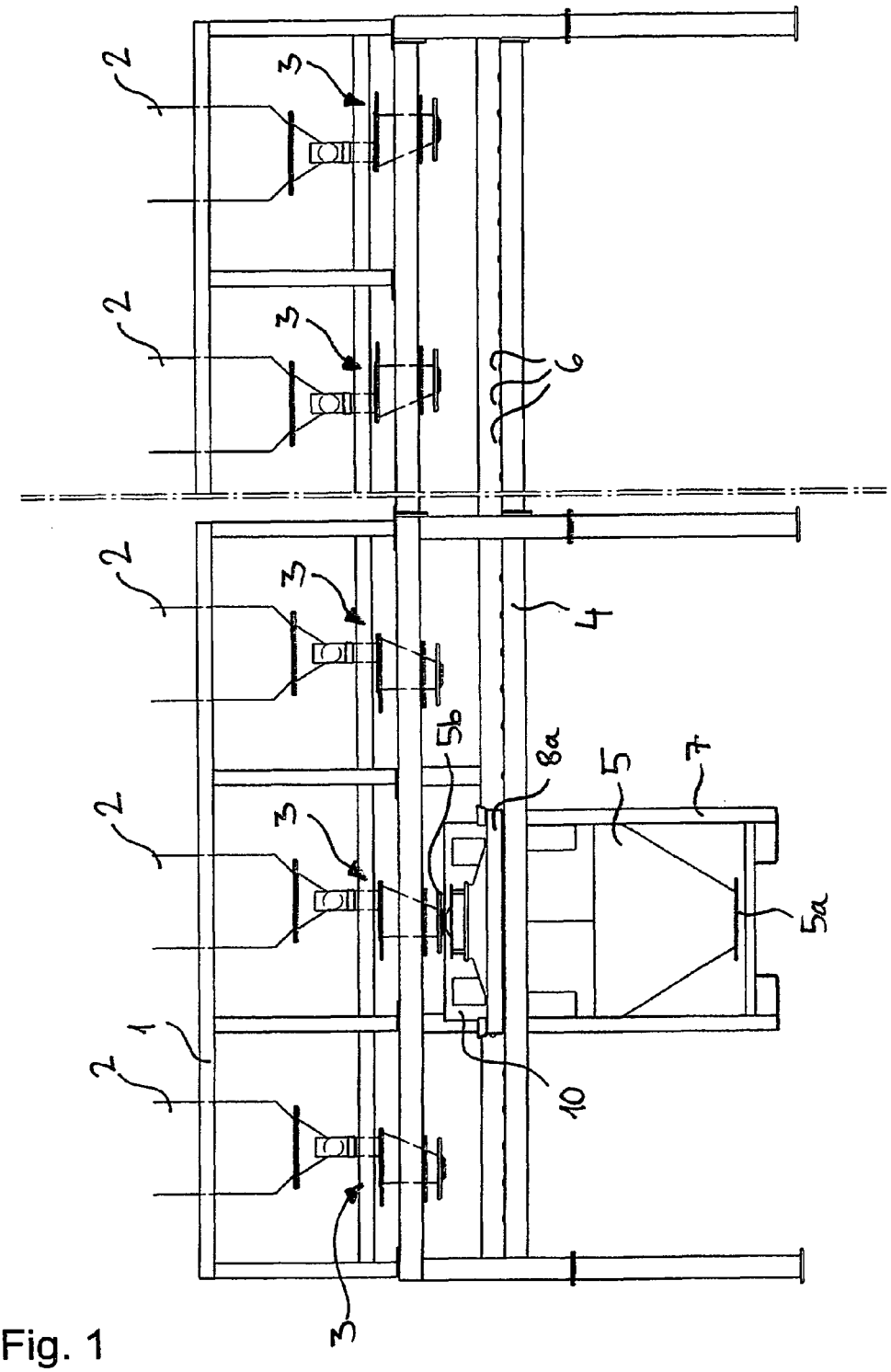
FIG. 1 shows a schematic side view of an embodiment of an inventive system for gravimetrically combining individual bulk material components in transport containers.
Figure 2:
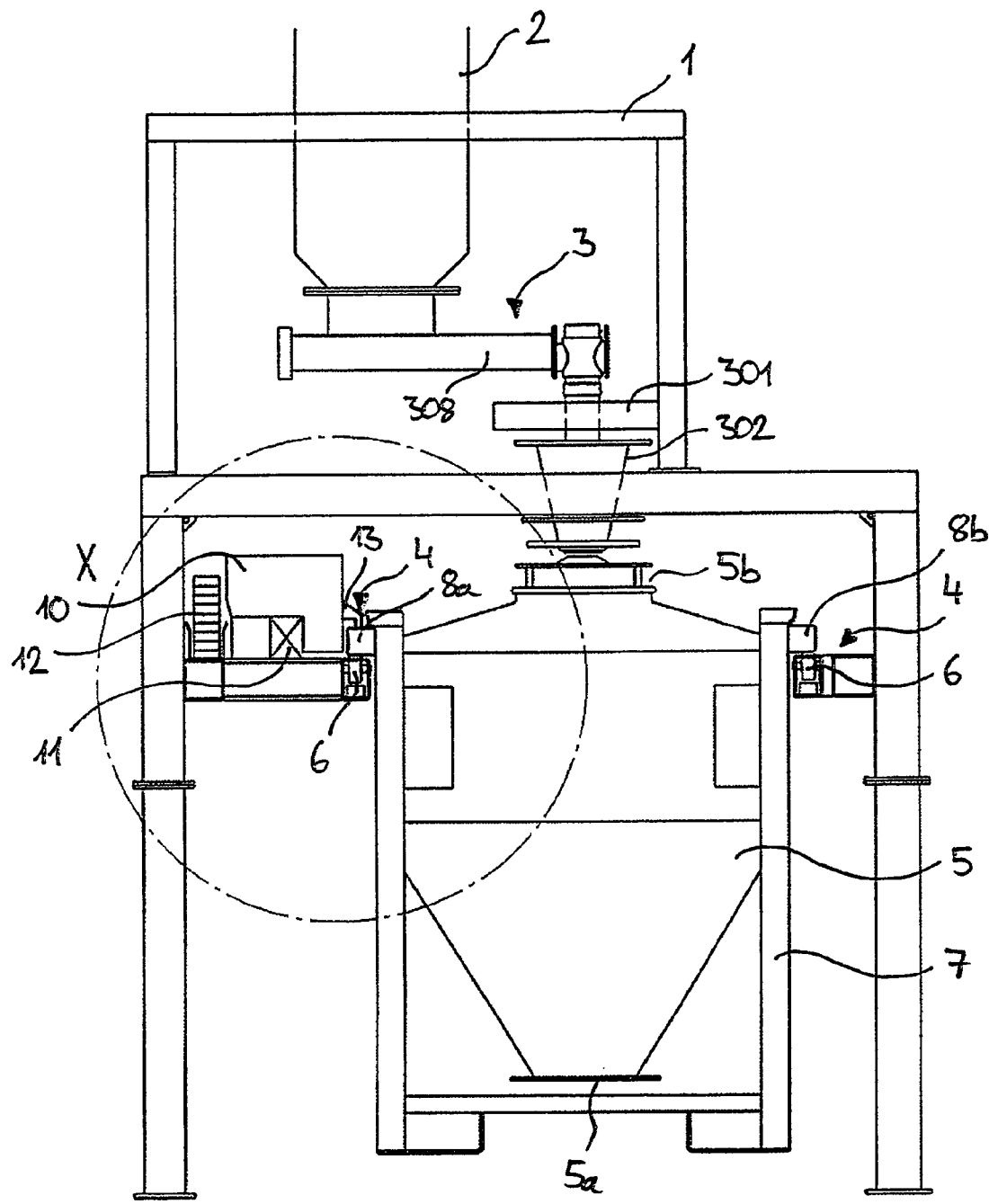
FIG. 2 shows a schematic view of the system in accordance with FIG. 1 (viewed from the right-hand side), wherein a transport container is located in its dosing position.

FIG. 1 shows a longitudinal support 1, illustrated with interruption e.g. as part of a supporting frame, in the form of an intermediate ceiling 1 of a company building etc., on which two or more supply containers 2 are arranged one behind the other or next to one another, which receive different, in particular substantially powdery or particle-shaped bulk material components. Each supply container 2 has on its lower side a dosing unit 3, shown in more detail in FIG. 2 and, in particular, in FIGS. 6 through 8, for each contained bulk material component. Only the lower sections of the supply containers 2 are shown in FIGS. 1 and 2. In the present embodiment, they are conventional silos or the like, wherein any other conventional containers may naturally also be used, such as sack emptying devices, big bags held in suitable supports or the like.

A guidance 4 is disposed on the supporting frame on the lower side of the dosing units 3 of the supply containers 2, along which one or, in particular, several transport containers 5 can be moved for displacing the transport containers 5 between the dosing units 3 of the different supply containers 2 and, if necessary, a discharge station (not shown), and for discharging the respective bulk material component into the transport container 5 or removing the mixture therefrom.

Each supply container 2 is thereby associated with a stationary weighing means disposed below the supply container, with which the transport container 5 cooperates, at least in its respective dosing position in which it receives the bulk material component from the respective supply container 2 (FIG. 1). As is shown, in particular in FIG. 4, towards this end, the guidance 5 has several guiding segments 4a, 4b, 4c, which are disposed one behind the other and in pairs in parallel in the guiding direction, at least some of which, i.e. those below the dosing units, on which the transport container 5 rests during dosing, e.g. the segments 4b in FIG. 4, are formed by weighing/guiding segments which are mechanically decoupled from the other guiding or weighing/guiding segments 4a, 4b, 4c for detecting the weight of the transport container 5 in its dosing position, thereby ensuring gravimetric dosing.

Figure 4:
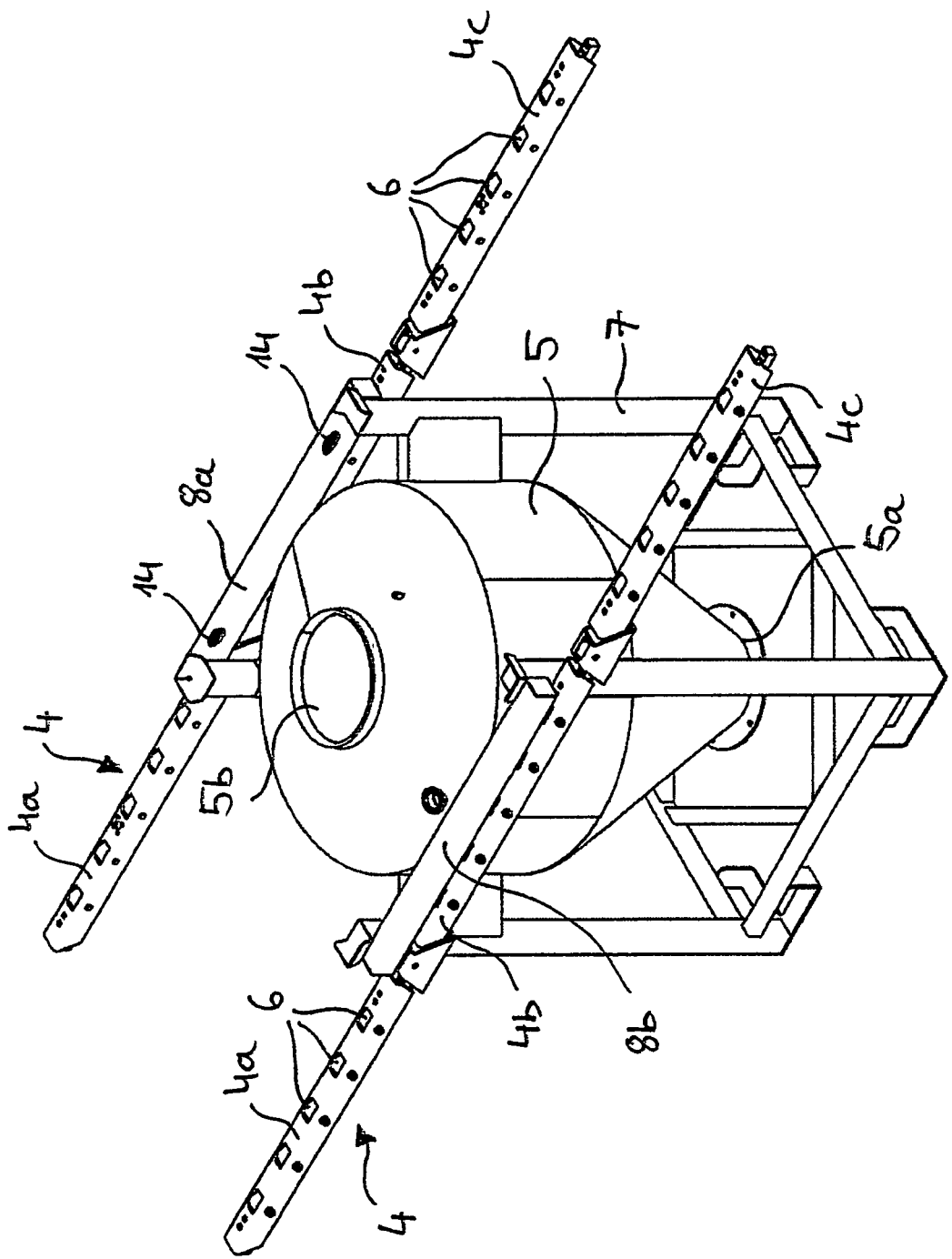
FIG. 4 shows a perspective detailed view of a transport container of the system in accordance with FIG. 1 including its guidance.

As is best shown in FIGS. 4 and 2, the guiding segments and also the weighing/guiding segments 4a, 4b, 4c are formed by supporting beams which are arranged in pairs and parallel to one another and may be mechanically separated from each other or may also be connected to each other and have rollers 6 on their upper sides in the present embodiment in order to ensure guidance of the transport container 5 with minimum friction. The transport containers 5 may e.g. be inserted into a supporting frame 7 which has supports 8a, 8b on its two opposite sides facing the guiding segments 4a, 4b, 4c, the length of which is larger than the separation of the rollers 6, such that the supporting frame 7 together with the transport container 5 may roll along on the rollers 6. The weighing/guiding segments 4b may otherwise practically have the same design as the "pure" guiding segments 4a, 4c, with the exception that the first ones-additionally detect the weight resting on them, whereas the "pure" guiding segments are e.g. more or less rigidly mounted to the supporting frame. The transport container 5 also has an e.g. conically tapering bottom. 5a which can be opened for removing the dosed bulk material components.

Figure 3:
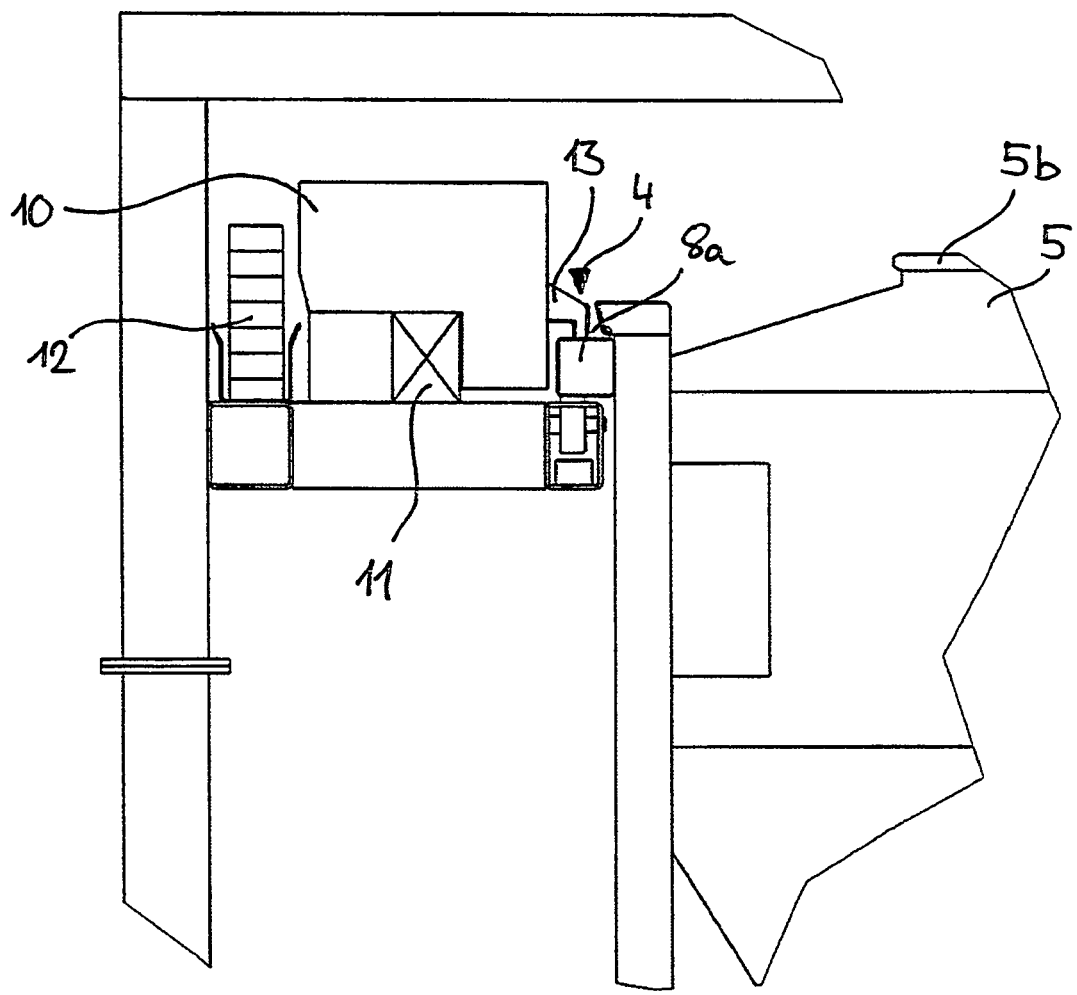
FIG. 3 shows a detailed view of a shuttle used for displacing the transport container along the guidance, in accordance with the section X in accordance with FIG. 2.

As is illustrated, in particular in FIGS. 2 and 3, the transport container(s) 5 is/are guided without drive on the guidance 4 in the present case, and are displaced along the guidance by one or more carriage(s) or shuttle(s) 10 which are driven in a controlled fashion and are, in turn, guided on a rail 11 which extends parallel to a row of the paired guiding or weighing/guiding segments 4a, 4b, 4c. The shuttle may be driven via toothed or friction wheels 12, belt drives or in any other conventional fashion. The shuttle 10 can thereby be coupled to the respective transport container 5 using carriers 13, and can be decoupled therefrom, wherein the carriers 13 in the illustrated embodiment are formed by pins that can be vertically displaced or pivoted and can be brought into detachable engagement with openings 14 (FIG. 4) provided on one of the supports 8a, 8b of the supporting frame 7 of the transport container 5. The shuttle 10 may thereby preferably have two carriers 13 disposed at a separation from each other in the guiding direction for accepting the torques generated while carrying along of the transport container 5. This detachable connection between the shuttle 10 and the transport containers 5 enables the respective transport container 5 to be temporarily disposed onto the respective weighing means, i.e. to be more precise on the respective weighing/guiding segments 4b during the dosing process, and to be available for further transport tasks of other transport containers 5 during the dosing time. In the transport position, the carriers 13 of the shuttle 10 consequently engage in the support 8a of the respective transport container 5 such that the transport container 5 can be displaced along the parallel guiding or weighing/guiding segments 4a, 4b, 4c while being engaged with the shuttle, as is illustrated in more detail in FIGS. 2 and 3. In its dosing position, the transport container 5 reaches the position, on a paired weighing/guiding segment 4b (FIG. 4) below the dosing unit. 3 of a supply container 2 (FIG. 1) for receiving a defined weight proportion of the bulk material component contained therein.

Figure 6:
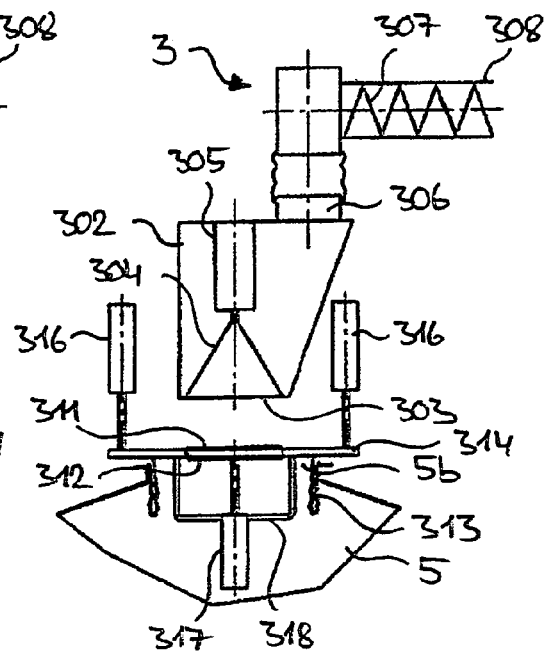
FIGS. 6 to 8 each show a view in correspondence with FIG. 5 in different states of a dosing process.
Figure 7:
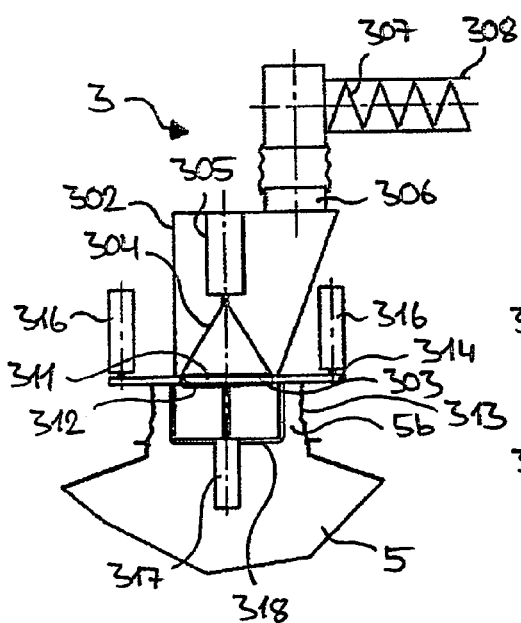
Figure 8:
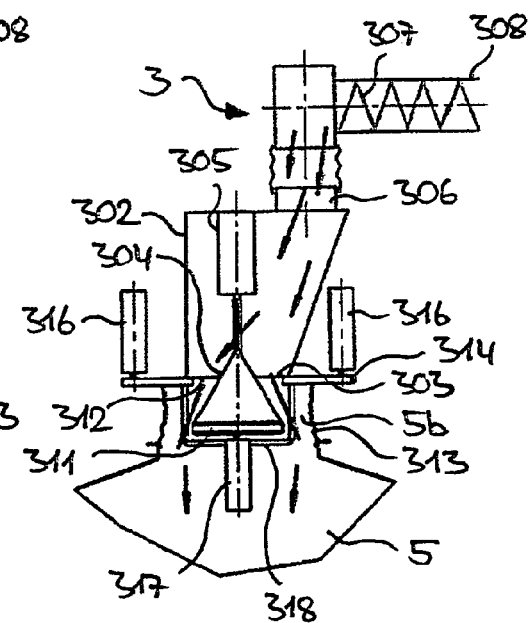

In order to ensure dosing of the bulk material components with minimum contamination, the dosing unit 3 and the inlet 5b disposed on the upper side of the transport container 5 facing the dosing unit 3 may e.g. have a design which is schematically shown in FIGS. 5 through 8. As is illustrated therein, the dosing unit 3 has a housing 302 which is fixed e.g. to a corresponding support 301 (FIG. 2) of the supporting frame with a dosing opening 303 disposed on its lower side. The dosing opening 303 can be opened and closed by means of a closure element 304, wherein the closure element 304 of the dosing unit 3 of the present embodiment is formed by an approximately conical plunger which can be displaced between its (upper) closed position (see FIGS. 5 through 7) and its (lower) open position (see FIG. 8), in the present case in a vertical direction by means of a piston/cylinder unit 305 which is fixed in the upper area of the housing 302. The drive of the piston/cylinder unit 305 may e.g. be realized hydraulically, pneumatically, hydropneumatically or in another way, e.g. using linear drives or the like. A dosing element 307, e.g. in the form of a screw conveyor, adjoins the upper side of the housing 302 via a connector 306, wherein the tubular housing 308 of the dosing element 307 terminates in the associated supply container 2 (see in particular FIG. 2). The conical shape of the closure element 304, which tapers to the top towards the connector 306, and the design of the housing 302 which is such that the dosing opening 303 virtually extends across the overall lower side of the housing 302 are used, in particular, for preventing dead spaces during the dosing process (FIG. 8). The same applies to the inclined arrangement of the right-hand side wall of the housing 302 of the dosing unit 3 below the connector 306 shown in FIGS. 5 through 8.

The transport container 5 has a receiving opening 312 on its upper side facing the dosing unit 3, which can be opened and closed by means of a closure element 311 and which can be detachably connected, if required, to the dosing opening 303 of the dosing unit 3 for transferring bulk material into the transport container 5 by means of the dosing unit 3. The receiving opening 12 of the transport container 5 is disposed on the transport container 5 by means of a resilient, in the present case approximately hose-shaped connecting element 313, which is realized in the illustrated embodiment in that the receiving opening 312 is disposed on a support 314 which is designed like an approximately plate-shaped cover and is connected to the inlet 5b of the transport container 5 on the edge side via the resilient connecting element 313. The latter is thereby fixed at one end to the lower side of the support 314 facing the transport container 5, thereby surrounding the receiving opening 12, in particular, in a sealing fashion, whereas its other end is mounted around the circumference of the inlet 5b of the transport container 5, in particular, also in a sealing fashion. For preventing transfer of forces between the dosing opening 303 of the dosing unit 3 and the receiving opening 312 of the transport container 5, the support 314 with the receiving opening 312 can be displaced at least in one situation illustrated in FIGS. 7 and 8 in which the dosing opening 303 is connected to the receiving opening 312, i.e. the transport container 5 is "docked" to the dosing unit 3 in a relative position with respect to the transport container 5 such that the support 314 with the receiving opening 312 is in contact with the transport container 5 or to be more exact with its inlet 5b exclusively via the resilient connecting element 313. It is thereby possible to prevent in a simple fashion secondary force connections between the dosing unit 3 and the transport container 5 at least during the dosing process and, if necessary, already during docking of the transport container 5 to the dosing unit 3 such that the weight of the transport container 5 determined by the associated weighing/guiding segment 4b (FIG. 4) is not falsified. Towards this end, in the illustrated embodiment, the support 314 with the receiving opening 312 may be displaced, in the present case approximately vertically, between a position shown in FIGS. 5 and 6, in which it is supported on the inlet 5b of the transport container 5 and in which the receiving opening 312 is aligned with the inlet 5b, and a position shown in FIGS. 7 and 8 in which the support 314 with the receiving opening 312 is lifted with respect to the transport container 5. In the present case, two piston/cylinder units 316 are provided for displacing the support 314 relative to the transport container 5, which piston/cylinder units are e.g. also disposed on the supporting frame or also on the housing 302 of the dosing unit 3 and may engage the upper side of the support 314 when the transport container 5 is in its dosing position located below a respective dosing unit 3. The piston/cylinder unit 316 may e.g. be operated in accordance with the unit 305.

Figure 5:
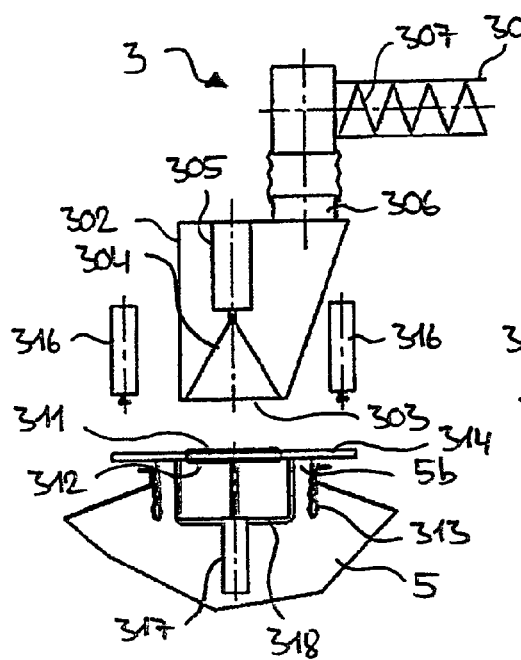
FIG. 5 shows a schematic detailed view of a dosing unit and of a transport container which is located in its dosing position, which are designed to be docked to each other, thereby being mechanically decoupled from each other.

The closure element 311 of the transport container 5 is formed substantially like an extendable plunger similar to that of the dosing unit 3, which can be displaced, in the present case also vertically, by means of a further piston/cylinder unit 317 between its (upper) closed position (FIGS. 5 through 7) and its (lower) open position (FIG. 8). The piston/cylinder unit 317 is driven in the same manner as the piston/cylinder units 305 and 316, wherein, in particular, in this case merely a mechanical or a fluid spring may alternatively be provided, which prestresses the closure element 311 of the transport container 5 in its closed position (FIGS. 5 to 7). In the illustrated embodiment, the cylinder of the piston/cylinder unit 317 is e.g. mounted to a rod 318, which, in the present case, is stationary with respect to the support 314 and fixed thereto such that the closure element 311 may be displaced together with the support 314 with respect to the transport container 5, in the present case vertically, whereas the closure element 311 can additionally be moved through displacing the piston rod of the piston/cylinder unit 317 between its open and closed positions. Moreover, the closure element 311 of the transport container 5 may, in particular, be coupled to the closure element 304 of the dosing unit 3, wherein the latter can be brought into contact from the outside against the outer side of the closure element 311 for docking the transport container 5 to the dosing unit 3, wherein the cross-sections of both closure elements 304, 311 or the dosing/receiving openings 303, 312 are advantageously substantially congruent in order to prevent undercuts in the docked state, which could lead to undesired bulk material accumulation.

In order to provide pressure compensation between the inside of the dosing unit 3 or the transport container 5 and the surroundings, a pressure compensation element may moreover advantageously be provided, wherein in the present embodiment, the resilient connecting element 313 itself is simultaneously used as a pressure compensation element in that it is at least partially or also completely formed from filter material, e.g. in the form of a filter fabric. The permeability of the filter material should thereby be selected in such a fashion that even the smallest particle fraction contained in the bulk material to be dosed cannot pass the filter material such that the bulk material cannot get in contact with the surroundings. At the same time, the tight connection between the dosing opening 303 and the receiving opening 312 prevents formation of gaps or other leaks, through which the bulk material could get in contact with the surroundings.

The dosing process may be performed as described below: In FIG. 5, the closure element 304 of the dosing opening 303 of the dosing unit 3 and also the closure element 311 of the receiving opening 312 of the transport container 5 are in their closed positions. The support 314 with the receiving opening 312 is supported on the upper inlet 5b of the transport container 5. The transport container 5 has just been moved by the shuttle 10 along the guidance 4 (FIGS. 1 through 4) to its dosing position located below the dosing unit 3, in which its receiving opening 312 is aligned with the dosing opening 303 of the dosing unit 3. As is illustrated in FIG. 6, the support 314 with the receiving opening 312 of the transport container 5 is grasped through expansion of the pistons of the piston/cylinder units 316 and is lifted through contracting the pistons of this piston/cylinder units 316 to a level at which the support 314 is connected to the upper inlet 5b of the transport container 5 only via the resilient connecting element 313 (FIG. 7). The closure element 304 of the dosing opening 303 of the dosing unit 3 thereby abuts the outer side of the approximately congruent closure element 311 of the receiving opening 312 of the transport container 5. The dosing opening 303 is connected to the receiving opening 312. The transport container 5 consequently has docked to the dosing unit 3, wherein any secondary force connections between the dosing unit 3 and the transport container 5 are eliminated due to the resilience of the connecting element 313. As is illustrated in FIG. 8, the dosing opening 303 is then opened together with the receiving opening 312 by displacing the intercoupled closure elements 304, 311 from their (upper) closed position (FIG. 7) into their (lower) open position (FIG. 8). This may be realized through synchronized movement of the piston/cylinder units 305, 317, wherein it may, in particular, also be advantageous for a piston/cylinder unit, e.g. the lower 317 of the transport container 5, to be formed by a fluid spring which is prestressed in the direction of the closed position, in the present case in an upward direction, or any other e.g. mechanical spring which is compressed against its prestress through actuation of the piston/cylinder unit 305 for keeping the closure element 311 of the transport container 5 in contact with that 304 of the dosing unit 3. When a connection between the dosing unit 3 and the transport container 5 has been established in this fashion, the screw conveyor 307 of the dosing unit 3 is rotated, thereby transferring the bulk-material from the dosing unit 3 into the transport container 5, as is illustrated by arrows in FIG. 8.

Figure 9:
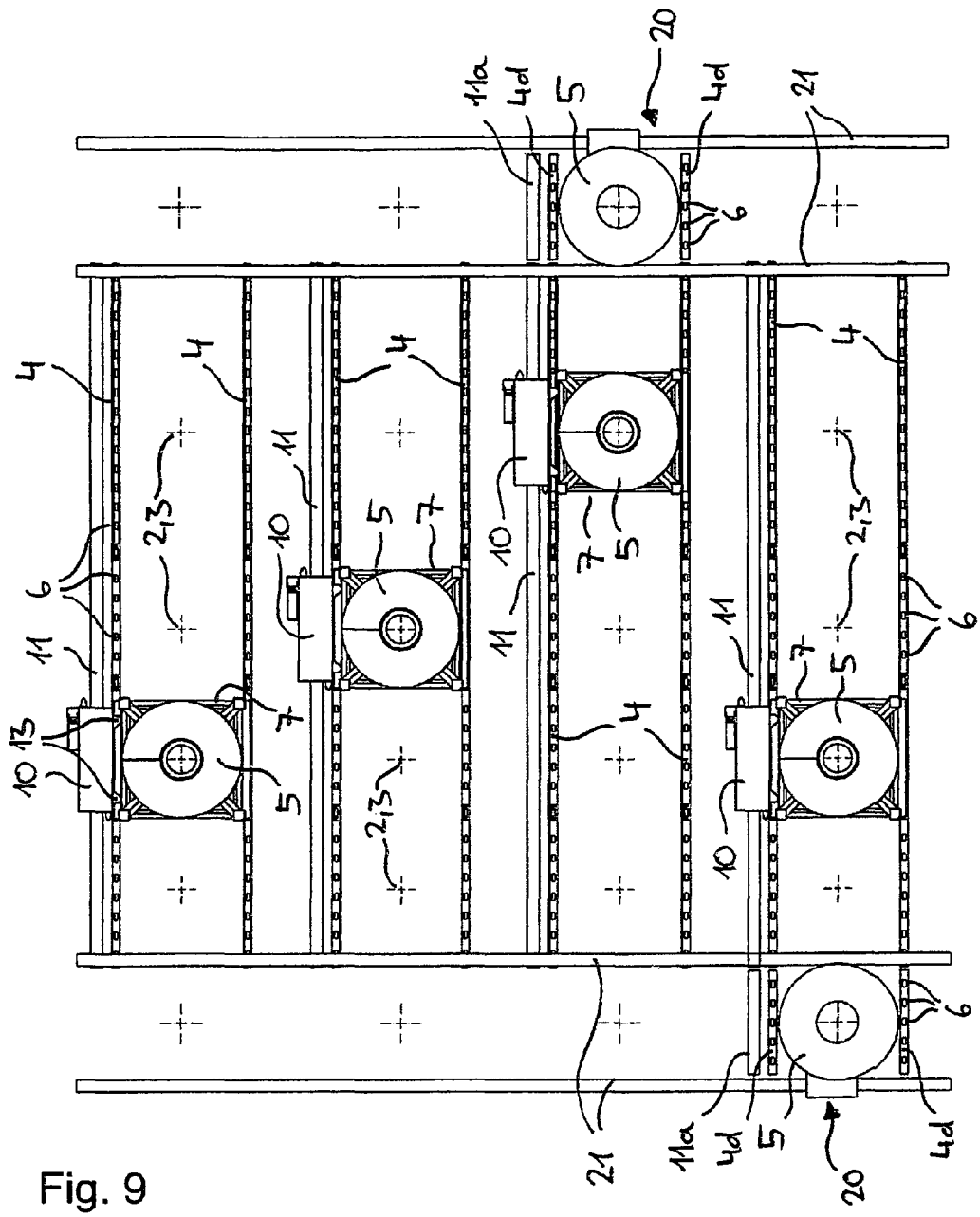
FIG. 9 shows a schematic top view of a system with several rows of guidances and relocating means for transferring the transport containers between the guidances.

When the weighing means associated with the transport container 5, on the weighing/guiding segments 4b of which the transport container 5 is supported during the above explained dosing process, has detected the desired amount of dosed bulk material, the screw conveyor 307 is stopped and the closure elements 304, 311 are moved again into their (upper) closed position through actuation of the corresponding piston/cylinder units 305, 317. In this respect, the situation corresponds again to that of FIG. 7. The support 314 with the receiving opening 312 is subsequently moved back into its position supported on the inlet 5b of the transport container 5 (FIG. 6) by means of the piston/cylinder units 316, whereafter the expanded pistons of this piston/cylinder units 316 release the support 314 and move back into their position retracted in the cylinder (FIG. 5). The transport container 5 is then consequently completely undocked from the dosing unit 3. The transport container 5 can eventually be moved to the dosing unit 3 of a further supply container 2 (FIG. 1) by means of the shuttles 10 or be moved to a discharge station (not shown), where the mixture of bulk materials composed in accordance with the desired composition can be removed from the transport container 5 and, if necessary, be transferred to further processing stations, such as a portioning station, packaging station etc. FIG. 9 shows an embodiment of an inventive system, in which several, in the present case four, rows of supply containers 2 are provided, which are merely indicated by a cross, each comprising one dosing unit 3 for receiving, in particular, different bulk material components. One guidance 4 corresponding to FIGS. 1 through 4 extends below each row of supply containers 2 and approximately parallel to each other. The same applies for the guidance 4 of a rail 11 of the shuttle 10, which is associated with each row, wherein in the present embodiment, each row has one shuttle 10. The weighing/guiding segments 4b (FIG. 3) of the weighing means associated with each supply container 2 are, in turn, arranged below the respective supply containers 2 such that the respective transport container 5 is supported thereon in the dosing positions illustrated in FIG. 9.

A relocating means 20 is arranged at least one end of the guidances 4, in the present case at both ends, which is used for relocating the transport container 5 between the rows of guidances 4. The relocating means 20 are guided on rails 21 or tracks, which extend in a transverse direction, in particular, approximately perpendicularly with respect to the rows of guidances 4, which is suitably realized by a controllable drive (not shown) of the relocating means 20. In the illustrated embodiment, the relocating means 20 on the left-hand side in FIG. 9 has been moved into a position in which it can receive the transport containers 5 that are moved on the lower guidance 4, whereas the relocating means 20 on the right-hand side in FIG. 9 has been moved into a position, in which it can receive transport containers 5 that are moved along the second lowest guidance 4. Towards this end, the relocating means 20 themselves have a pair of guiding segments 4d which are disposed in parallel and the structure of which substantially corresponds to the guiding segments or weighing/guiding segments 4a, 4b, 4c (FIG. 4) of the guidances 4, which are therefore also advantageously provided with rollers 6, wherein the relocating means 20 are positioned in FIG. 9 in such a fashion that their guiding segments 4d are aligned with those of the guidances 4 such that one continuous guidance is formed for each transport container 5. The guiding segments 4d of the relocating means 20 may be designed as "pure" guiding segments or, if desired, as weighing/guiding segments. The relocating means 20 correspondingly comprise a rail piece 11a which is aligned with the rails 11 of the rows of guidances 4 in the illustrated position such that the respective shuttle 10 in the position illustrated in FIG. 9 can also be moved back and forth between the rails 11 and the rail piece 11a of the relocating means 20 for transporting transport containers 5 from the respective guidance 4 to the relocating means 20 and from that to the respective guidance 4.

A design of this type comprising several rows of supply containers 2 and at least one relocating means 20 may not only require less space compared to a mere linear arrangement of supply containers 2 but also prevents, in particular, blocking of the guidance 4 by several transport containers 5, e.g. during the dosing process thereof in that the transport containers 5 can "avoid each other" along the parallel guidances 4. The direction of movement of the transport containers 5 may advantageously be fixedly determined, wherein the direction of movement of each transport containers 5 along the rows of guidances 4 may be selected to be S-shaped, i.e. in the first and third row from the left to the right or right to the left and in the second and fourth row from the right to the left or left to the right.

Figure 10:
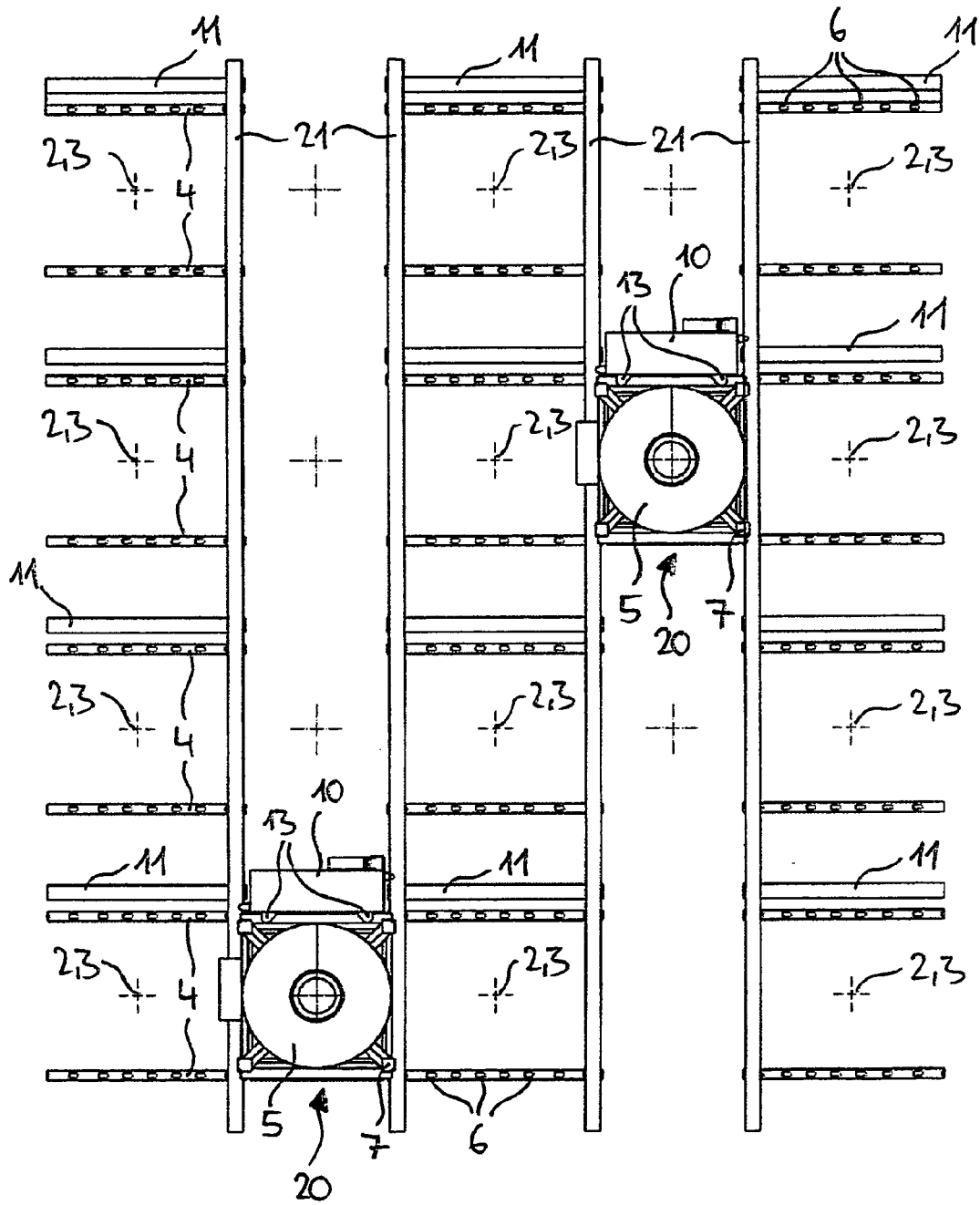
FIG. 10 shows a top view of a system with an alternative arrangement of the plurality of rows of guidances and relocating means in correspondence with FIG. 9.

The embodiment illustrated in FIG. 10 of an inventive system differs from that of FIG. 9 mainly by the arrangement of the relocating means 20, which are e.g. identical and in this case do not extend at the ends of each guidance 4 but transversely through the rows of guidances 4, wherein in the present embodiment, one supply container 2 with dosing unit is arranged on each of the two sides of the rails 21 of the relocating means 20. In this case, the guidances 4 may exclusively comprise weighing/guiding segments 4b (FIG. 4). The main direction of movement of the transport containers 5 may in this case be rotated through 90° e.g. with respect to the design of FIG. 9, i.e. it extends in the direction of displacement of the relocating means 20 along the rails 21, wherein the shuttle 10 may supply the respective transport container 5 to the respective supply containers 1 on both sides of the rails 21.

We claim:

1. A system for gravimetrically combining individual bulk material components in at least one transport container, the system comprising:
   a plurality of storage containers for storing the bulk material components;
   a plurality of dosing units, each storage container cooperating with one dosing unit;
   at least one transport container for accepting a respective bulk product component transferred by a dosing unit;
   a plurality of weighing means, wherein each storage container is associated with one weighing means disposed below a respective storage container, said transport container being structured to cooperate with each of said weighing means;
   a guidance along which said transport container can be moved between dosing units of said supply containers, said guidance having several guiding segments that are disposed behind one another in a guiding direction and on which said transport container is guided, wherein at least guiding segments disposed below said dosing units of said supply containers are formed by weighing/guiding segments, which are mechanically decoupled from other guiding segments and/or weighing/guiding segments, such that said transport container is in a respective dosing position on said weighing/guiding segments for detecting a transport container weight; and
   at least one carriage, said carriage structured for displacing said transport container along said guidance, said carriage being driven in a controlled fashion, wherein said carriage is guided on a rail which extends parallel to said guidance, wherein said carriage can be coupled to and decoupled from said transport container by means of carriers.

2. The system of claim 1, wherein said weighing/guiding segments and said guiding segments are disposed in pairs, parallel to each other.

3. The system of claim 1, wherein said guiding segments and said weighing/guiding segments are formed by track sections, upper sides of which defining a guiding track for guiding means of said transport container.

4. The system of claim 3, wherein said guiding track of said track sections or said guiding means of said transport container are provided with rolling or sliding means.

5. The system of claim 1, wherein said carriage is guided on a rail.

6. The system of claim 1, wherein said carriage has at least two carriers, which are disposed at a separation from each other in said guiding direction and can be coupled to and be decoupled from said transport container.

7. The systems of claim 1, further comprising blocking means for said transport container for fixing said transport container in a respective dosing position.

8. The system of claim 1, wherein the system comprises several transport containers and several carriages.

9. The system of claim 1, wherein said transport container has a receiving opening which faces said dosing units of said supply containers and which can be closed, each of said closing units having a dosing opening which faces said transport container and which can be closed, wherein said receiving opening and said respective dosing opening can be moved to coincide during transfer of a respective bulk material component from a respective supply container into said transport container.

10. The system of claim 9, wherein said dosing opening of said dosing unit can be detachably connected to said receiving opening of said transport container in a substantially dust-free fashion, with said dosing unit thereby being mechanically decoupled from said transport container.

11. The system of claim 10, wherein said dosing opening of said dosing unit and/or said receiving opening of said transport container is/are disposed on said dosing unit or on said transport container by means of a resilient connecting element for preventing transfer of forces between said dosing unit and said transport container, wherein interconnected dosing/receiving openings can be arranged in a relative position with respect to said dosing unit or on said transport container such that transfer of forces between said dosing unit and said transport container is prevented by said resilient connecting element.

12. The system of claim 11, wherein said dosing opening and/or the receiving opening is/are arranged on a support which can be displaced substantially perpendicularly with respect to said dosing opening or substantially perpendicularly with respect to said receiving opening, said support being connected to said dosing unit and/or to said transport container via said resilient connecting element, wherein said support can be moved into a relative position with respect to said dosing unit or said transport container, wherein, in said relative position, said support is in contact with said dosing unit or said transport container exclusively via said resilient connecting element.

13. The system of claim 9, wherein a closure element of said dosing opening can be coupled to a closure element of said receiving opening and said closure elements can be displaced together between an open position and a closed position.

14. The system of claim 1, wherein said supply containers are arranged along said guidance in at least one row.

15. The system of claim 1, wherein said supply containers are arranged in at least two rows along at least two guidances, wherein said at least two guidances are associated with at least one relocating means, which is designed for relocating said transport container between said guidances.

16. The system of claim 15, wherein said relocating means is guided on rails or tracks, which extend substantially transversely to said guidances.

17. The system of claim 15, wherein said relocating means has at least one guiding segment, which can be aligned with said guiding segments and/or said weighing/guiding segments of said at least two guidances such that said transport container can be displaced between said guiding segments and/or said weighing/guiding segments of said at least two guidances and a guiding segment of said relocating means.

18. The system of claim 1, wherein said guidance is structured to be suspended.

* * * * *